INVENTOR.
SCOTT W. HENDERSON
BY
Lockwood, Woodard, Smith & Wickart
Attorneys

United States Patent Office 3,102,376
Patented Sept. 3, 1963

3,102,376
LAWN TRIMMING AND CUTTING TOOL
Scott W. Henderson, 115 Conradt Ave., Kokomo, Ind.
Filed Feb. 2, 1961, Ser. No. 86,686
6 Claims. (Cl. 56—294)

The present invention relates to a cutting structure finding primary utility as a lawn mower trimming and cutting tool.

In the past, various cutters have been designed for effectively cutting grass and the like. Some of these cutters operate by a shearing action and are known as reel type cutters while others thereof operate by an impact cutting action and are known as rotary cutters. Certain types of grass or weeds grow in parallel relation to the surface of the ground in the form of runners. Furthermore, in relatively warm states such as Florida and California, the lawns include vine-like materials similar to crab grass which also grow in generally parallel relation to the surface of the ground. Neither the above mentioned reel-type nor the rotary-type lawn mowers are capable of effectively cutting such vine-like grasses.

It has been found that the only effective way to defeat crab grass and to cut the Florida and California types of grasses in order to prevent the formation of a heavy mat and resulting mold is to cut the parallel growing runners. Certain types of devices (known as "thinners") have been designed for cutting such runners. However, these devices are not capable of also cutting the conventional vertically growing grasses such as blue grass, rye and the like. Consequently, a primary object of the present invention is to provide a grass cutting device capable of cutting in a single operation not only vertically growing grasses but also horizontally growing grasses.

Related objects and advantages will become apparent as the description proceeds.

One embodiment of the present invention comprises a grass cutting device of a non-cutter bar type including a substantially horizontally disposed, high speed, rotatable element arranged for support at a predetermined distance from the ground. A plurality of blades are mounted on and spaced axially along the element and each have a first cutting portion extending outwardly of the element but at an acute angle to the axis thereof. Each cutting blade includes a further cutting portion extending from the distal end of the first cutting portion radially of the axis of the rotatable element.

The full nature of the invention will be understood from the accompanying drawings and the following description and claims:

Figure 1:
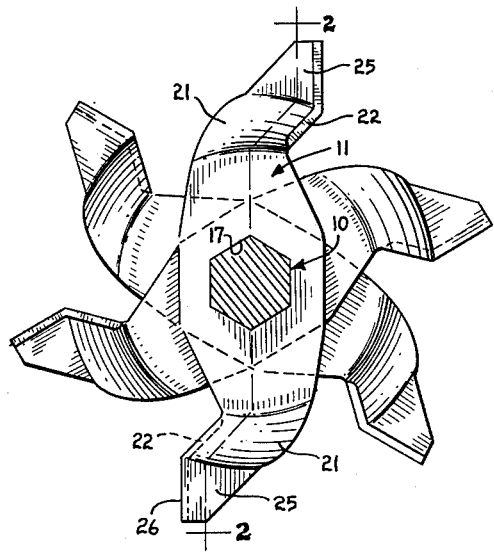
FIG. 1 is a vertical section of the cutter alone.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, a polygonal spindle or shaft 10 forms a mounting location for a plurality of cutting blades 11. The spindle includes a reduced threaded portion 12 adjacent each end to accommodate a locking nut 15. The shaft 10 includes a still further reduced portion 16 which is so constructed that it can be radially journalled within the bearings of the mower wheels (not shown).

Figure 2:
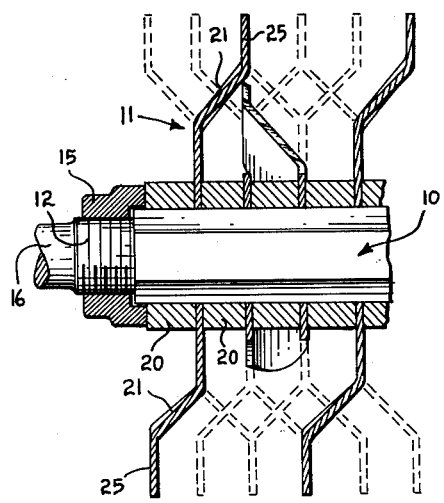
FIG. 2 is a longitudinal section of the structure of FIG. 1 taken along the line 2—2 in the direction of the arrows.
Figure 4:
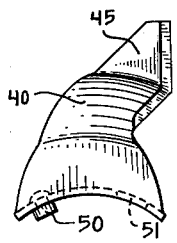
FIG. 4 is a side elevation of a blade carrying element forming a part of the structure of FIG. 3.
Figure 5:
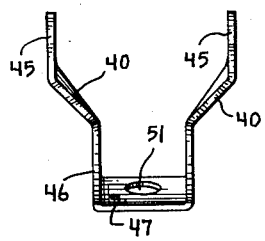
FIG. 5 is a front elevation of the element of FIG. 4.
Figure 6:
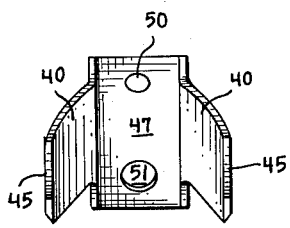
FIG. 6 is a top view of said element.
Figure 3:
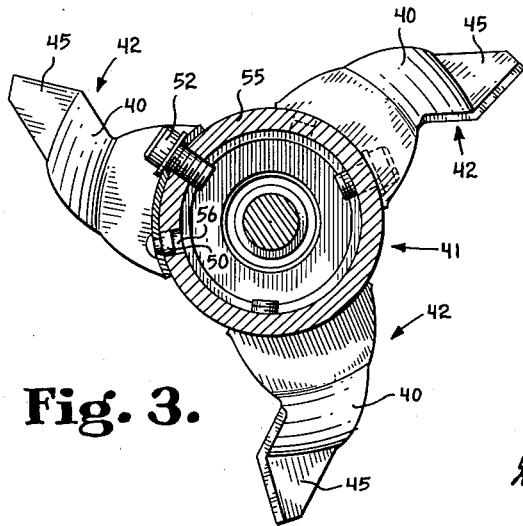
FIG. 3 is a vertical section of an alternative embodiment of the cutter of the present invention.

Each of the cutter blades 11 is stamped out centrally to form a polygonal aperture 17 which is shown in the illustrated embodiment of FIGS. 1 and 2 as having a hexagonal shape. Each of the blades 11 is received upon the shaft 10 which extends through the aperture 17, the apertures having the same size and shape as the shaft whereby rotation of the shaft also rotates the blades 11. A plurality of collars 20 is received upon the shaft and functions to space the various blades axially along the shaft. The nuts 15 are, of course, tightened to a sufficient extent as to tightly retain the blades in the illustrated relationship.

Each of the blades is formed with a first cutting portion 21 which extends at an acute angle to the axis of the shaft 10 and has a cutting edge 22. Because of the inclined relation of the cutting portion 21, the blades can be rotated about the axis of the shaft to cut conventional grasses such as blue grass and rye grass. The outwardly inclined relationship of the portions 21 makes the blades self-cleaning at this point by reason of the fact that any grass accumulating on the portions 21 is thrown outwardly as the result of centrifugal force.

Formed at the distal ends of the first cutting portions 21 are vertically extending portions 25 which function to cut the horizontally growing runners such as crab grass and the like which are located relatively closely to the ground. In operation, it is usually advisable that the shaft be spaced such a distance from the ground that the tips of the vertically extending cutting portions 25 are relatively close to or are at the ground surface. In this manner, the high speed rotation of the cutting device results in a thinning action whereby the runners of crab grass and the like are cut and air can freely circulate through the mat which normally accumulates just adjacent to the ground.

In operation, the cutter of the present invention is removably mounted in the mower wheels at a predetermined position from the ground and will have associated therewith a pulley for driving purposes. The pulley will be connected by means of a belt to the flywheel of a gasoline engine or the like. Since the present invention is not concerned or does not relate to the manner in which the driving power is generated, no drawings have been made covering this portion of the device and reference is made to my U.S. Patent No. 2,923,117 for a disclosure of such an arrangement. It should be mentioned, however, that the power source should rotate the shaft 10 at a very high speed preferably at an r.p.m. of not less than 5,000 which speed has been found to be sufficient to insure impact cutting. A suitable engine for this purpose might be Briggs and Stratton engine Model No. 61101 manufactured by Briggs and Stratton of Milwaukee, Wisconsin. Since the top speed of this engine is 3,600 r.p.m., the pulley diameters would be appropriate to step up the speed of shaft 10 to 5,000 r.p.m. This engine is, of course, merely an example since many other types and sizes of power means could be used. In the preferred embodiment of the invention, the cutting edge 22 of the inclined portion 21 and the cutting edge 26 of the vertical portion 25 are spaced at an average distance from the axis of the shaft 10 of three inches. Thus, it can be appreciated that the average speed of these cutting edges is not less than 1,309 feet per second.

It should be noted that the spacers 20 are so proportioned as to have a dimension axial of the shaft such that the swaths of the cutting edges 22 of adjacent blades overlap. This result is achieved because of the fact that the cutting edges of adjacent ones of the blades 11 are spaced peripherally as well as axially along the shaft. Referring to FIG. 2, the dotted lines indicate the positions or path of the blades 11 as they rotate about the shaft 10 and demonstrate the overlapping nature of the paths.

The direction of rotation of the cutter is not critical. It has been found, however, that if the cutter is rotated in such a direction that the blades cut while mowing forwardly away from the operator, then the blades also act to throw stones and other obstacles forwardly rather than rearwardly where they might strike and injure the operator. It should also be mentioned that the cutting blades are preferably formed of spring steel although other suitable materials can be used.

Referring to FIGS. 3–6, an alternative embodiment of the invention is disclosed which is identical to the above described embodiment as regards having a first cutting portion 40 extending at an acute angle of the axis of the rotating element 41 upon which cutter blades are carried. Also similarly to the above described embodiment, the embodiment of FIGS. 3–6 includes a radially or vertically extending cutting portion 45 formed on the distal ends of the first cutting portion 40. These two cutting portions on each blade act as above described to not only cut vertically through the crab grass runners and the like but also to mow the conventional grasses of the lawn.

Each of the cutter blades 42 is formed with a spaced pair of the cutting portions 40 and a spaced pair of the cutting portions 45. Unlike the above described embodiment, all of the cutting portions of the blade are located on the same side of the rotatable support 41. Formed integrally with each portion 40 is a U-shaped mounting portion 46 which has a curved base 47 formed in a part-cylindrical shape and provided with a lug 50 and an aperture 51 which receives a mounting screw 52 to secure the respective blade 42 to a hollow cylindrical support 55 which forms a part of rotatable element 41, the lug 50 being hooked within a radial bore 56 in the cylindrical element. The various blades 42 are spaced axially as well as peripherally along the rotatable element 55 similarly to the spacing of the blades 11 in order that overlapping swaths are cut by the portions 40 of the blades.

The cylindrical mounting element 55 is particularly useful in applications where the length of the cutter is relatively great so that the shaft or spindle such as the shaft 10 would tend to vibrate at high speed rotation. I have found that a one-inch hexagon shaft such as the shaft 10 can rotate at 5,000 r.p.m. and can have a 20-inch length without developing noticeable whip or vibration. However, for a mower of 30 or 36-inch width, a solid shaft capable of preventing vibration or whip would be prohibitive in weight and for this reason a tube or cylinder such as the mounting element 55 is used. This tube is, of course, rotated by means of a pulley or the like as described above in connection with the first described embodiment.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A grass and the like cutting device of impact cutting type comprising a substantially horizontally disposed, high speed rotatable element arranged for support at a predetermined distance from the ground, said element being rotatable about a substantially horizontal axis, a plurality of blades mounted on and spaced axially along said element, said blades each having a first cutting portion extending in a direction having a horizontal and a radial component, said blades each having a further cutting portion extending from the distal end of said first cutting portion radially of said axis.

2. A rotary cutter for use in a lawn mower, said cutter including an element rotatable about an axis, a plurality of blade members mounted on and spaced axially along said element, said blade members each having a first cutting portion extending in a direction having a horizontal and a radial component, said blades each having a further cutting portion extending from the distal end of said first cutting portion radially of said axis.

3. A grass and the like cutting device of impact cutting type comprising a substantially horizontally disposed, high speed, rotatable element arranged for support at a predetermined distance from the ground, said element being rotatable about a substantially horizontal axis, a plurality of blades mounted on and spaced axially along said element, said blades each having adjacent their ends a first cutting portion extending outwardly of and at an acute angle to the axis of said element and a further cutting portion extending from the distal end of said first cutting portion radially of said axis.

4. A grass and the like cutting device of impact cutting type comprising a substantially horizontally disposed, high speed, rotatable element arranged for support at a predetermined distance from the ground, a plurality of blades mounted on and spaced axially along said element, said blades each having a first cutting portion extending outwardly at an acute angle to the axis of said element and a further cutting portion extending from the distal end of said first cutting portion radially of said axis, successive blades being axially and peripherally spaced relative to adjacent blades so that each first cutting portion cuts a swath overlapping the swath of an immediately adjacent first cutting portion.

5. A rotary cutter for use in a lawn mower, said cutter including a rotatable tube detachably carrying on the outer periphery thereof a plurality of generally U-shaped blade members, said blade members each being defined by a transversely flat blade mounting portion having integrally formed therewith along the sides thereof a pair of outwardly directed first cutting portions which are inclined relative to one another and at an acute angle to said tube, said blade members further including radially extending cutting portions integral with the distal ends of said first cutting portions.

6. A grass and the like cutting device of impact cutting type comprising a substantially horizontally disposed, high speed, rotatable polygonal shaft arranged for support at a predetermined distance from the ground, a plurality of elongated blades having centrally formed polygonal apertures of the same size as said polygonal shaft, said blades being received on said shaft for rotation therewith, said blades each having adjacent their ends first cutting portions extending outwardly of and at an acute angle to the axis of said shaft and further cutting portions extending from the distal ends of said first cutting portions radially of said axis.

References Cited in the file of this patent

UNITED STATES PATENTS

| | | |
|---|---|---|
| 906,346 | Williams | Dec. 8, 1908 |
| 1,107,004 | Whitcomb | Aug. 11, 1914 |
| 2,509,343 | Henderson | May 30, 1950 |
| 2,759,321 | Force | Aug. 21, 1956 |
| 2,788,038 | Corcoran | Apr. 9, 1957 |
| 2,827,751 | Mascaro | Mar. 25, 1958 |
| 2,841,946 | Skromme et al. | July 8, 1958 |
| 2,908,337 | Surprise et al. | Oct. 13, 1959 |
| 2,923,117 | Henderson | Feb. 2, 1960 |
| 2,969,820 | Gruendler | Jan. 31, 1961 |